United States Patent

Derighetti et al.

[11] Patent Number: 5,824,986
[45] Date of Patent: Oct. 20, 1998

[54] METHOD AND APPARATUS FOR WIRE EROSION

[75] Inventors: René Derighetti, Losone, Switzerland; Silvano Dresti, Canobbio, Italy

[73] Assignee: Agie SA, Losone, Switzerland

[21] Appl. No.: 762,840

[22] Filed: Dec. 10, 1996

[30] Foreign Application Priority Data

Dec. 19, 1995 [DE] Germany ............... 195 47 480.5

[51] Int. Cl.⁶ .................................................. B23H 7/06
[52] U.S. Cl. ............................................. 219/69.12
[58] Field of Search ..................... 219/69.12, 69.17

[56] References Cited

U.S. PATENT DOCUMENTS

| | | | |
|---|---|---|---|
| 4,232,208 | 11/1980 | Bühler | 219/69.12 |
| 4,479,045 | 10/1984 | Inoue | 219/69.12 |
| 4,499,359 | 2/1985 | Obara | 219/69.12 |
| 4,518,842 | 5/1985 | Obara | 219/69.12 |
| 4,520,253 | 5/1985 | Gamo et al. | 219/69.12 |
| 4,521,662 | 6/1985 | Kinoshita et al. | 219/69.12 |
| 4,523,073 | 6/1985 | Gamo et al. | 219/69 W |
| 4,546,227 | 10/1985 | Gamo et al. | 219/69.12 |
| 5,122,630 | 6/1992 | Reynier et al. | 219/69.12 |
| 5,233,147 | 8/1993 | Magara | 219/69.12 |
| 5,451,737 | 9/1995 | Bertholds et al. | 219/69.12 |

FOREIGN PATENT DOCUMENTS

| | | |
|---|---|---|
| 0 581 968 A1 | 2/1993 | European Pat. Off. . |
| 28 26 270 C2 | 6/1978 | Germany . |
| 29 21 356 A1 | 5/1979 | Germany . |
| 29 32 734 A1 | 8/1979 | Germany . |
| 654 233 A5 | 5/1983 | Switzerland . |
| 657 553 A5 | 9/1986 | Switzerland . |

Primary Examiner—Geoffrey S. Evans
Attorney, Agent, or Firm—Darby & Darby

[57] ABSTRACT

The excursion (a) of a wire electrode (10) is held constant at a pre-set value during the machining operation. The forward feed rate of an X/Y drive (24), the pulse frequency of the machining pulse or a combination of both these erosion parameters are preferably selected as a regulated quantity for effecting the wire excursion (a).

13 Claims, 4 Drawing Sheets

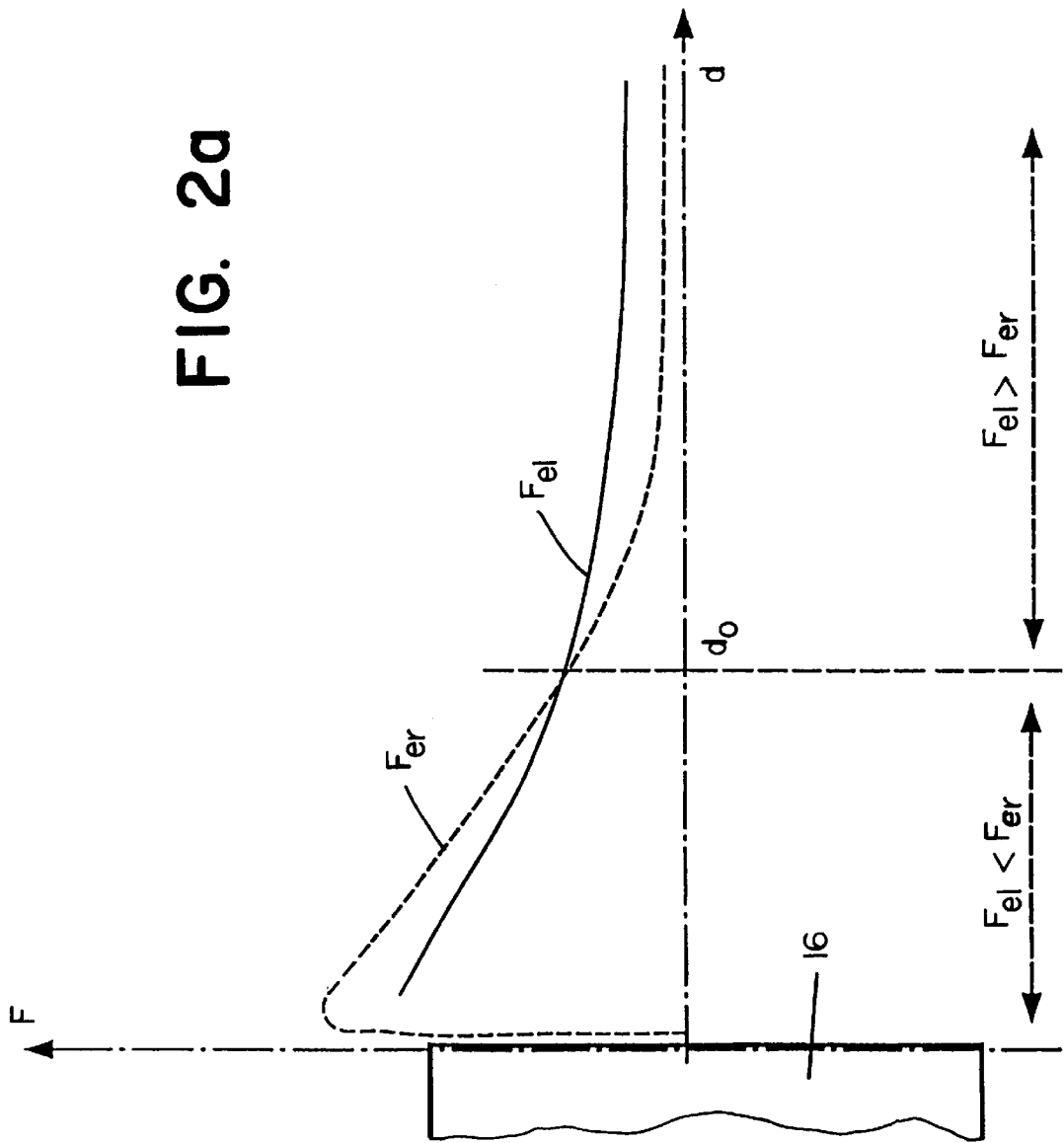

METHOD AND APPARATUS FOR WIRE EROSION

BACKGROUND OF THE INVENTION

1. Field of the Invention

The invention relates to a method for wire erosion taking into consideration the deflection of a wire electrode caused by the machining operation and an automatic control system for carrying out the method.

2. Description of the Related Art

During wire erosion, starting from a pilot hole or a reference surface, a contour is cut by a first electrode—the wire electrode—into a or from a second electrode—the workpiece. Herein, the wire electrode is withdrawn continuously from a supply spool, guided over a wire guide disposed above the workpiece to the machining zone, then discharged through the machining zone and over a wire guide disposed below the workpiece.

A specific problem arises during wire erosion in that during the erosion process mechanical and electrical forces cause a permanent excursion or convex curvature of the wire electrode which is easily flexed, from its rest position. This wire excursion which, depending on the specific erosion conditions, is pointing in the same or in the opposite direction as the machining or forward feed direction, causes undesirable deviations from the programmed reference path especially with curved cutting contours.

In most known wire erosion devices the excursion caused by the machining operation is not measured and is not controlled by a controller. Only at the time when the cutting contours are programmed are the geometrical values adjusted using empirically obtained values which, depending on the type of machining, for example full or trim cutting, take into account the contour error caused by the wire excursion. Since these empirically obtained correction parameters may not be absolutely repeatable, it will always be necessary to readjust the correction values; in addition, contour errors which occur under new cutting conditions, can only—if at all—be obtained after lengthy experimentation.

A method of the aforedescribed type is known from DE-PS 28 26 270 C2. In this case, the excursion of the wire electrode from its rest position is continuously measured and the reference path of the wire guides is corrected based on this excursion information in such a way that the path traveled by the wire electrode corresponds to the reference path. This path correction takes place via an automatic control system which is slow compared to the forward feed control. In spite of an optimum design of this automatic control system, the eroded surfaces exhibit nevertheless undesirable imperfections. These imperfections occur especially for complex cutting geometries. In order to avoid these disadvantages, pre-programmed contour-dependent speed reductions are usually introduced, the reproducibility of which depends on a number of uncontrollable factors.

SUMMARY OF THE INVENTION

It is the object of the invention to improve the precision during wire cutting. The invention accomplishes this objective through a method for wire erosion by taking into account the excursion of a wire electrode which is caused by the machining operation, wherein one or more erosion parameters are modified, such that the wire excursion of the wire electrode remains constant during the machining operation. Specifically, the method may include correcting a programmed cutting contour by the wire excursion (a) in such a way that the wire electrode travels along a pre-set reference cutting path (s). This is accomplished by implementing a control system for a wire erosion apparatus which comprises at least one wire position sensor for continuously measuring a wire excursion of a wire electrode; and a controller for effecting one or more erosion parameters, such that the wire excursion remains constant during the machining operation. Further, the control system according to the invention includes a comparator at the controller and a controller output transmitter which modifies the pulse frequency of the machining pulses and/or the forward feed speed (Vx, Vy) of the wire electrode as a function of the control difference. Further, the control system comprises a memory for receiving the signals from the wire position sensor and for storing the position of the wire electrode in its rest position before the machining operation starts.

The suitable automatic control system comprises at least one wire position sensor for continuously measuring the wire excursion and a controller which—based on the measured wire excursion and a comparison with a pre-set reference excursion—effects one or more erosion parameters in such a way that the wire excursion remains constant during machining.

It is one concept of the invention to eliminate the unavoidable wire excursion which depends on a number of factors—which are in part known, in part not completely understood—, as an element of uncertainty during wire erosion by employing a certain control strategy: During machining, the wire excursion is continuously monitored tangentially and, if necessary, also perpendicular to the cutting direction and is compared with a pre-set fixed excursion reference value tangentially and, if necessary, also perpendicular to the cutting direction. If a deviation from the reference excursion is detected, the erosion parameter responsible for the wire excursion is modified in such a way that the wire excursion maintains a constant value. In this way, possible fluctuations of the wire excursion caused by momentary changes in the erosion conditions, for example as a result of the uniformity of the material, by changing mechanical stability of the wire electrode, etc., and the degradation of the cutting quality associated therewith, are eliminated.

The wire excursion can now be included as a fixed parameter during the set-up of the wire erosion machine. Hereby, the programmed cutting geometry is preferably corrected for the contouring error induced by the wire excursion in such a way that the wire electrode travels the pre-set reference contour.

As an improvement over the method known from DE-PS 28 26 270 C2, now the wire excursion is also controlled. The stability in the wire excursion achieved herewith is ideal for correcting the programmed cutting contour as, for example, carried out in the so-called DLS (Pilot) correction used by the company AGIE. Only by combining a correction of the programmed cutting contour which includes the wire excursion caused by the machining operation, with the control strategy proposed here, will an optimum result with respect to precision and reproducibility of the cutting geometry be achieved for arbitrary erosion conditions.

Quantities which are suited to be regulated are basically all erosion parameters from which the electrical and mechanical forces which act on the wire electrode during the machining and which cause the wire excursion, depend, for example, speed and direction of the forward feed control, pulse current, pulse duration, and quiescent periods between the machining pulses, as well as flushing pressure and the flushing volume of the dielectric. The pulse frequency of the machining pulses and the forward feed rate of the wire electrode tangential to the cutting direction have proven to be particularly advantageous regulated quantities. These erosion parameters can be used to effect the excursion of the wire electrode without interfering in an undesirable manner with other factors, such as the surface roughness resulting from chemical deposits, working gap dimensions, etc.

The pulse frequency and the forward feed rate of the wire electrode are preferably modified as follows:
  at a pre-set cutting speed, the wire excursion is held constant by changing the pulse frequency of the machining pulses (so-called iso-energetic pulses);
  at a pre-set pulse frequency, the wire excursion is held constant by changing the cutting speed of the wire electrode, and
  at a pre-set pulse frequency (or at a pre-set cutting speed, as the case may be), the wire excursion is at first held constant by modifying the forward feed rate and, if necessary, during a subsequent control cycle by modifying the pulse frequency (or the cutting speed, as the case may be).

The speed of the automatic control system counteracting a possible deviation of the wire excursion from the reference deviation must, of course, be matched to the speed with which the wire electrode actually changes its position. The same applies to the speed of the wire guide drives in the case where the forward feed rate is changed, and for the speed of a generator control in the case where the pulse frequency of the processing pulses is adjusted.

During the erosion process, there are acting on the wire electrode mechanical forces, for example mechanical restoring forces resulting from the tension force applied to the wire electrode, flushing forces as well as the erosion forces generated by the erosion process (so-called erosion pressure), and electromagnetic and electrostatic forces between the wire electrode and the workpiece. It is known that the mechanical inertia and the mechanical tension force of the wire electrode counteract the electrical forces, the erosion pressure and the flushing forces. However, the magnitude and the direction of the individual forces depend on the specific erosion conditions, especially on the type of the cut, for example if a curved or straight full or trim cut is performed, and on the distance between the wire electrode and the workpiece. It is difficult to assess the impact of these forces on the position of the wire electrode.

In any case, these forces taken together lead to an excursion of the wire electrode from its rest position. The control strategy proposed here takes all these forces into consideration as a whole, in that not only the wire excursions as such are eliminated, but in that their magnitude is held constant by modifying primarily the pulse frequency and/or the forward feed rate. In this way, the wire excursion which is unavoidable during wire erosion, is transformed into a manageable technical quantity. Any inaccuracies in the cutting contour which in the past were the result of fluctuations in the wire erosion, are hereby eliminated.

The proposed regulated quantity, namely the excursion of the wire electrode, also indicates changes in the erosion conditions during the machining process. Conversely, changes in the wire excursion allow conclusions about energy changes in the processing zone, for example a change in the mechanical energy of the wire electrode, in the electrical energy of the capacitor formed by the wire electrode and the workpiece, and in the magnetic energy of the inductor formed by the wire electrode. The method for monitoring the wire excursion proposed herein can advantageously also be used for monitoring the entire erosion process. Any deviations from the pre-set reference excursion allow conclusions concerning, for example, momentary contamination of the working gap, the danger of a short circuit or a wire break, the flushing conditions or deficiencies in guiding the wire. If the measured wire excursion falls below a preset minimum value, then measures for preventing a deterioration of the process are automatically initiated. Such measures could be:
  maintaining the erosion process by reducing the pulse frequency of the machining pulses as well as the cutting speed when lateral short circuits could occur;
  reducing the machining current and the cutting speed and, if necessary, reversing the wire feed when short circuits occur without wire break;
  abruptly interrupting the machining operation and, if necessary, activating an automatic wire threading when short circuits occur with wire break.

In addition, the control of the wire excursion according to the invention can also be used for monitoring the geometry of the workpiece. In contrast to the known methods, which only control electrical quantities, such as the ignition delay, the ignition voltage, the breakdown voltage, the average machining current, etc., and hold them constant, here a quantity is controlled which depends on the distance between the wire electrode and the workpiece. The aforementioned electrical quantities are in reality "independent of the direction" and are therefore incapable of providing information about the geometry of the workpiece. In particular, when inner and outer corners are cut during full cuts or during trim cutting of profile sections which deviate from the reference geometry of the workpiece, a high cutting precision can only be a achieved when the wire excursion is analyzed with respect to both its direction and its magnitude.

Depending on the type of the cut and/or the machining current, the erosion parameters are preferably controlled in such a way that the wire excursion—vertically or tangentially as well as perpendicular to the cutting path—has a pre-set value. For determining the regulated quantities used to influence the wire excursion, a tangential and perpendicular deviation from the reference excursion may be weighted differently and the tangential and the perpendicular component of the wire excursion may consequently be different.

Under special erosion conditions, the value "zero" is chosen as the reference excursion, meaning that the wire electrode remains in its rest position during machining. This is the case when, on one hand, the mechanical restoring forces and, on the other hand, the electrical forces, the erosion pressure and the flushing forces are canceling each other exactly. In most cases, this condition is not satisfied, so that the direction of the reference excursion is usually chosen as follows: opposite to the cutting direction for a straight full cut; with a tangential and a perpendicular component relative to the cutting direction for a curved full cut; or crosswise to the cutting direction for trim cuts. The magnitude of the reference excursion is selected depending on the wire diameter, the wire type and the desired erosion power.

For trim cuts, a distinction has to be made between trim cuts for correcting geometry errors (correction cuts) and trim cuts for improving the surface roughness (finish cuts). For both correction cuts and full cuts, the erosion forces determine the direction of the wire excursion, so that a wire excursion crosswise to the cutting direction is selected. For correction cuts, any fluctuations of the lateral wire excursion mainly depend on the change in the direction and the amplitude of the erosion forces due to the varying amount of material to be cut during the trimming operation. In order to safely correct a contour cut, it is sufficient to keep the lateral and tangential excursion of the erosion wire electrode. This is preferably accomplished by adjusting the forward feed rate in that the forward feed rate is decreased when more material has to be removed, and increased when less material has to be removed. In any event, the curvature of the wire remains constant and the trim cut precision is consequently maintained. The maximum trim cutting speed is determined by the pre-set reference value of the wire excursion.

For finish cuts, on the other hand, the electrostatic forces dominate which deflect the wire electrode towards the workpiece. In this case, the maximum allowed lateral wire excursion is selected crosswise to the cutting direction.

The proposed automatic control system is preferably suited to determine a calibration or reference value for the wire excursion: in this case, the rest position of the wire electrode is automatically determined by means of a wire position sensor before machining starts and is entered as a calibration value into a control computer of the wire erosion machine.

If the pulse frequency of the machining pulses is increased significantly, the dimensions of the working gap can change, thereby influencing the erosion results. This effect can preferably be counterbalanced by monitoring any changes in the working gap by a measurement of the working gap resistance and, if necessary, counteracted by increasing the flushing pressure for stabilizing the erosion gap. Preferably, by using an inner control loop having a higher speed than the control for the wire excursion, the machining process is monitored based on the ignition delay, the average machining voltage, the number of no-load pulses and/or the occurrence of short circuits.

Further advantages and adaptations of the invention will become apparent from the following description of preferred embodiments. In the description, reference is made to the appended schematic drawing.

BRIEF DESCRIPTION OF THE DRAWINGS

In the drawings:

FIG. 2a shows a distribution of the forces acting on the wire electrode during trim cutting as a function of the working gap;

DETAILED DESCRIPTION OF THE PRESENTLY PREFERRED EMBODIMENTS

Figure 1:
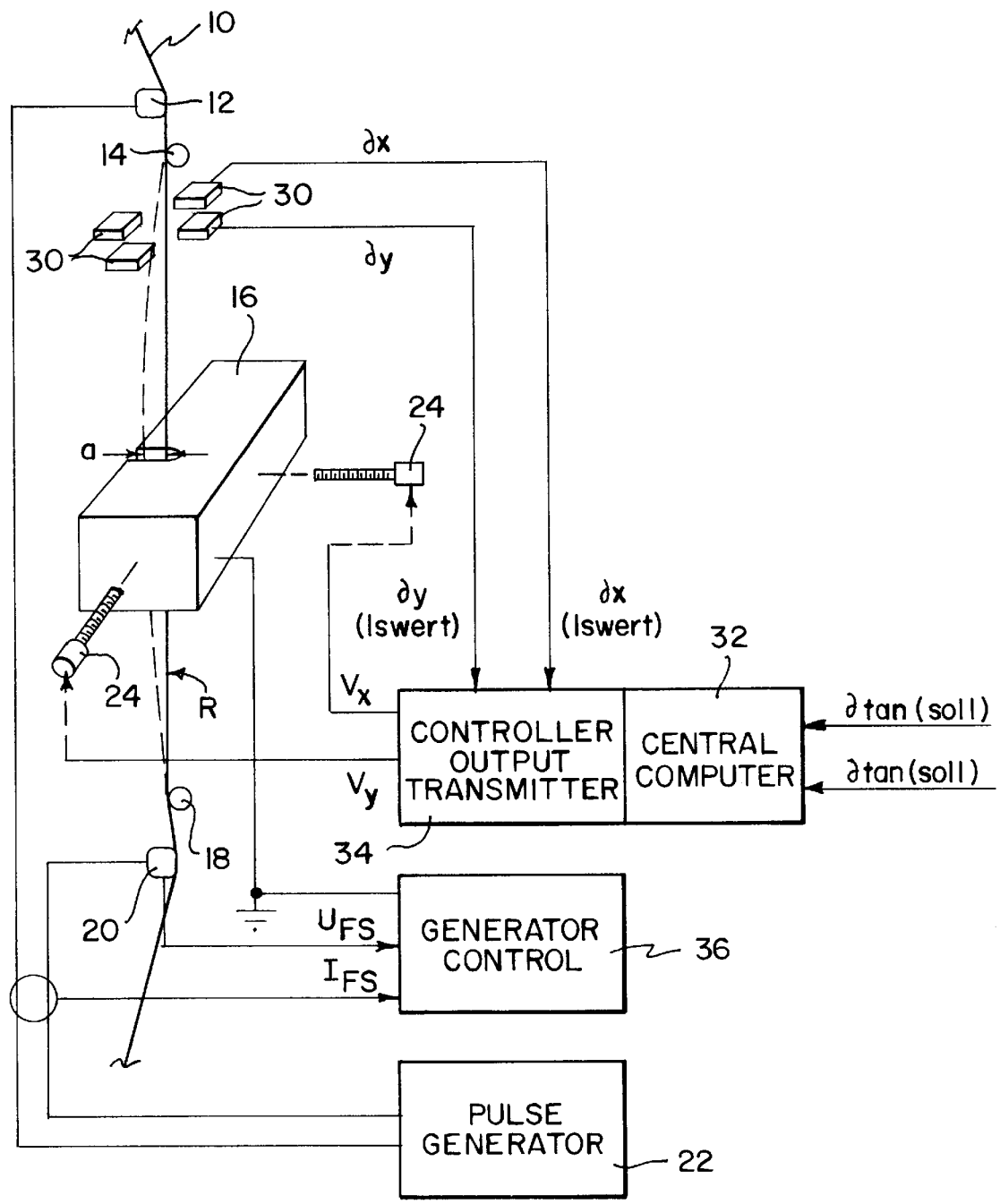
FIG. 1 shows an arrangement for wire cutting, including an automatic control system, according to the invention.

FIG. 1 is restricted to the description of a purely schematic representation of the essential parts—required for understanding the invention—of a wire erosion machine. Basic elements, such as machine frame, drives, wire supply system and flushing system are not shown, since they are regarded as obvious.

In FIG. 1, a wire electrode 10 is unwound under tension in a known manner from a first wire spool (not shown here), travels past a current supply unit 12 and an upper wire guide 14, traverses the processing zone in the workpiece 16 and is pulled by a wire pulling device (not shown here) over a lower wire guide 18 past another current supply unit 20. In the processing zone, the workpiece 16 is surrounded by a dielectric flushing agent which for wire erosion usually comprises demineralized water. The processing pulses $I_{FS}$, $U_{FS}$ supplied by a generator 22 are applied between the workpiece 16 and the wire electrode 10 via the current supply units 12 and 20.

The wire guides 14 and 18 serve to support the wire electrode 10 in a defined position in relation to the workpiece 16. The workpiece 16 is mounted on a work table provided with a X/Y drive 24—as indicated schematically in FIG. 1—for generating a forward feed motion of the wire electrode 10 relative to the workpiece 16 along the direction of the major axes X/Y according to the desired contour of the cut.

Even if the greatest possible tension is applied to the wire electrode 10, the wire electrode 10 will be deflected, in the manner shown, from its rest position R (shown here as a bold line) by an amount a due to the electrical and mechanical forces exerted during the machining operation. The magnitude and direction of this excursion is measured by way of a wire position sensor 30 disposed proximate to the upper wire guide 14. Wire position sensors of this type are known from the company AGIE and described, for example, in DE-PS 28 26 270 C2 or EP 0 312 056 B1. In addition, software already existing can advantageously and easily be transferred and augmented by at most a few routines.

The wire position sensor 30 shown in FIG. 1 comprises four different sensor heads arranged in opposite pairs around the wire electrode 10 for continuously measuring the components δx and δy, respectively, of the wire excursion along the major axes X/Y.

According to the method of the invention, the excursion of the wire electrode is maintained at a constant pre-set value during the machining. Preferably selected as a controlled variable for influencing the wire excursion is the forward feed rate of the X/Y drive 24, the pulse frequency of the machining pulses or a combination of these two erosion parameters.

The actual values of the components δx (Istwert) and δy (Istwert) of the wire excursion in the X/Y direction are continuously measured via the wire position sensor 30, thereby detecting possible fluctuations in the wire excursion, and transmitted to a control computer 32 via a suitable measurement circuit. Since here the wire excursion is measured in relation to the fixed major axes X/Y, the components δx, δy are first transformed by a coordinate transformation into the components δ tan, δ sen—tangential and perpendicular, respectively, to the cutting direction—and then compared with a pre-set reference excursion δ tan (soll), δ sen (soll)—tangential and perpendicular, respectively, to the cutting direction.

If a deviation (control difference) from the pre-set reference excursion is detected, a controller output transmitter 34 connected to the output of the control computer 32 generates the regulated quantities Vx, Vy for the actuating motors of the X/Y drive 24. The regulated quantities are such that a deviation from the pre-set reference excursion is counteracted by changing the forward feed rate of the X/Y drive 24. Alternately or in combination therewith, the above described control difference is transmitted to a generator control 36 connected to the output of the control computer 32. The pulse frequency of the machining pulses of the generator 22 is changed by the generator control 36 in such a way that the deviation of the actual wire excursion from the reference wire excursion is compensated.

Depending on the type of the cut and on the machining current, the wire excursion—both tangentially and perpendicular to the cutting path—is controlled to a pre-set value δ tan (soll) and δ sen (soll), respectively. When the aforedescribed regulated quantities for effecting the wire excursion are derived, the deviation of each of the components δ tan and δ sen from the corresponding pre-set excursion can be weighted differently and consequently, the tangential and the perpendicular component of the controlled wire excursion can be different. The magnitude A of the deviation can be weighted as follows by the coefficients k tan and k sen for the excursion tangentially and perpendicular to the cutting path:

$$A = (k\ tan^*(\delta\ tan)^2 + k\ sen^*(\delta\ sen)^2)^{1/2}$$

The selection of the coefficients k tan and k sen depends on the desired result, especially the desired cutting precision. If it is desired to keep the wire excursion crosswise to the cutting direction as small as possible during trim cutting, then k sen>k tan should be selected.

The generator control 36 in FIG. 1 furthermore comprises an inner control loop having a higher speed than the control for the wire excursion, for controlling the current and voltage values $I_{FS}$, $U_{FS}$ of the machining pulses for monitoring the erosion process for possible signs of deterioration.

Depending on the type of the cut, the erosion apparatus is FIG. 1 is described as follows:

In the rest position, i.e. before the start of the actual erosion process, without applied flushing pressure and with the wire electrode at rest, the wire 10 is positioned in its rest position. Even in its rest position, the wire electrode 10 is not located at the ideal neutral zero-position as a result of its flexural strength and of the change in direction at the wire guides 14, 18. Nevertheless, the rest position of the wire electrode 10 is suitable for performing an automatic calibration. Before each machining operation, the rest position of the wire electrode 10 is automatically measured with the help of the wire position sensor 30 and stored in the control computer 32 as reference value for the subsequent control of the wire excursion. Another reference value can be obtained by measuring the wire position when the wire travels to, for example, a starting position in absence of an applied current while the flushing is activated. Here, too, the wire position is determined by the flexural strength of the wire electrode 10 and, in addition, by potential wire oscillations having a resonant frequency which inside the water dielectric is lower by approximately a factor of 50 than the pulse frequency, and by the flushing.

During the erosion, the excursion of the wire electrode 10 is influenced by different electrical and mechanical forces which are stronger or weaker depending on the type of the cut. During a full cut, the erosion pressure caused by the removal of material itself is dominant and the wire electrode 10 is deflected predominantly opposite to the cutting direction away from the workpiece 16. In this case, the wire erosion apparatus is preferably operated with high machining currents and high pulse frequencies; any fluctuations in the wire excursion are counteracted by increasing the forward feed rate of the X/Y drive 24 when the wire excursion increases, and by decreasing the forward feed rate of the X/Y drive 24 when the wire excursion decreases.

For trim cuts for correcting geometry errors (so-called correction cuts), the situation is similar as for full cuts. For trim cutting precision surfaces (so-called finish cuts), the electrostatic forces dominate, pushing the wire electrode 10 against the workpiece 16. In this invention, both wire excursions, regardless if the are directed towards or away from the workpiece 16, are held constant during the machining operation.

Figure 2B:
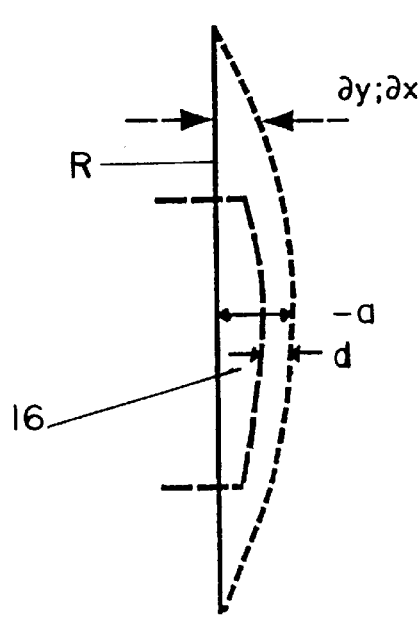
FIG. 2b shows a negative excursion of a wire to move away from a workpiece.
Figure 2C:
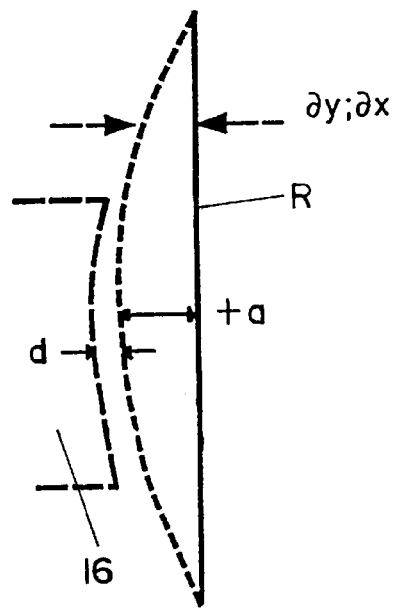
FIG. 2c shows a positive excursion of the wire away from a workpiece.

The forces effecting the wire electrode during trim cutting and the wire excursion resulting therefrom are described hereinafter with reference to FIGS. 2a–2c. As shown in FIG. 2a, the distribution of the electrostatic forces $F_{el}$—shown as a continuous line—and of the erosion forces $F_{er}$ (or erosion pressure) is shown as a function of the distance d between the workpiece 16 and the wire electrode 10. It has to be noted that the erosion forces $F_{er}$ point in a "negative" direction (crosswise to the cutting direction) away from the workpiece 16, whereas the electrostatic forces $F_{el}$ are directed "positively" towards the workpiece. The illustrated distribution of the forces shows that the electrostatic forces $F_{el}$ decrease with increasing distance substantially inversely proportional to the distance d. In comparison, the erosion forces $F_{er}$ decrease somewhat more steeply with distance. The electrostatic forces $F_{el}$ and the erosion forces $F_{er}$ cancel each other at a certain distance $d_0$, this being the point where the dashed line and the continuous line intersect. If other mechanical and electrical forces present during the trim cutting process are neglected, the wire excursion in this case has the value "zero." Or, in other words, the wire electrode 10 is here in its rest position R, a position which it also assumes before the erosion process starts. For distances $d<d_0$, the erosion forces $F_{er}$ dominate, such that the wire undergoes a positive excursion+a away from the workpiece 16, as shown in FIG. 2c. For distances $d>d_0$, the electrostatic forces $F_{el}$ dominate, such that the wire excursion has a negative value −a so that the wire is pushed towards the workpiece 16, as shown in FIG. 2b.

Depending on the type of cut, if straight or curved, if correction or finish cut, and depending on the wire type and the desired machining power, according to this model, either the electrostatic forces $F_{el}$ of the erosion forces $F_{er}$ caused by the removal of material dominate. Correspondingly, a positive or a negative wire excursion will have to be selected as reference value for the present method.

Figure 3A:
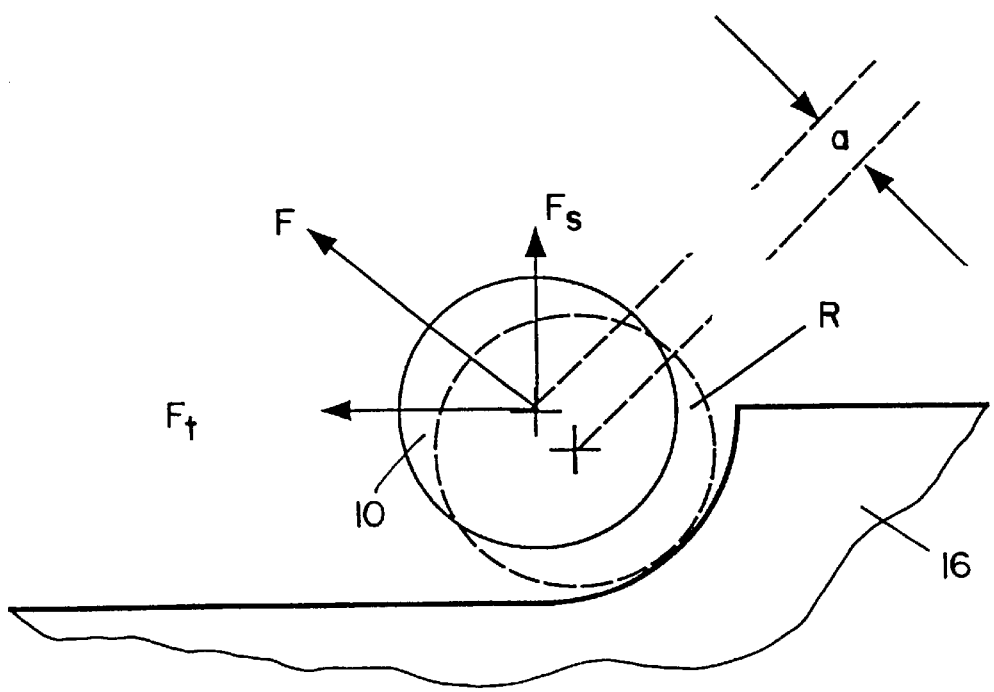
FIGS. 3a, b show a deflected wire electrode in cross-section during trim cutting of a straight profile section (FIG. 3a) and a curved profile section (FIG. 3b)
Figure 3B:
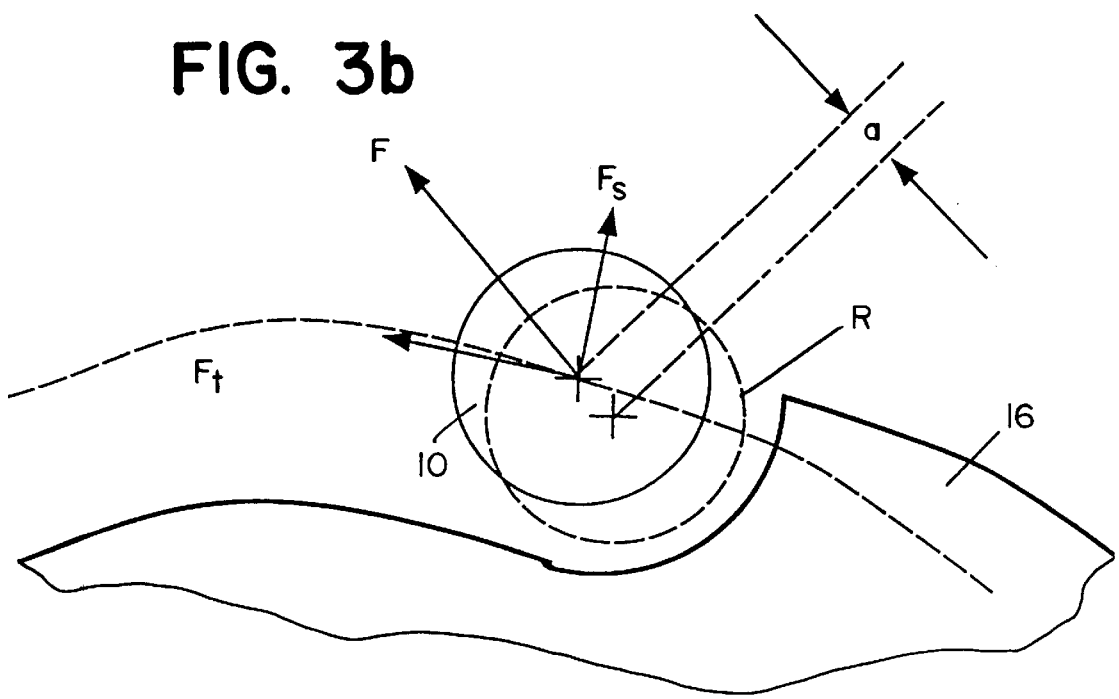

In FIGS. 3a and 3b, the wire electrode 10 is shown in cross-section in high magnification, when cutting either a straight contour (FIG. 3a) or a curved contour (FIG. 3b). The dashed outlines indicate the rest position R of the wire electrode 10, the continuous outlines indicate its position under the influence of the forces applied to the wire electrode 10 by the machining operation. These forces are composed of a component $F_t$ tangential to the cutting and forward feed direction and a force $F_s$ perpendicular to the cutting direction. The wire electrode 10 is deflected from its rest position by an amount a. The components δx, δy of the wire excursion in the direction of the major axes X/Y are continuously measured with the aid of the wire position sensor 30 shown in FIG. 1 and checked by the control circuit therein for potential deviations from a pre-set reference excursion and, if necessary, compensated.

Figure 4:
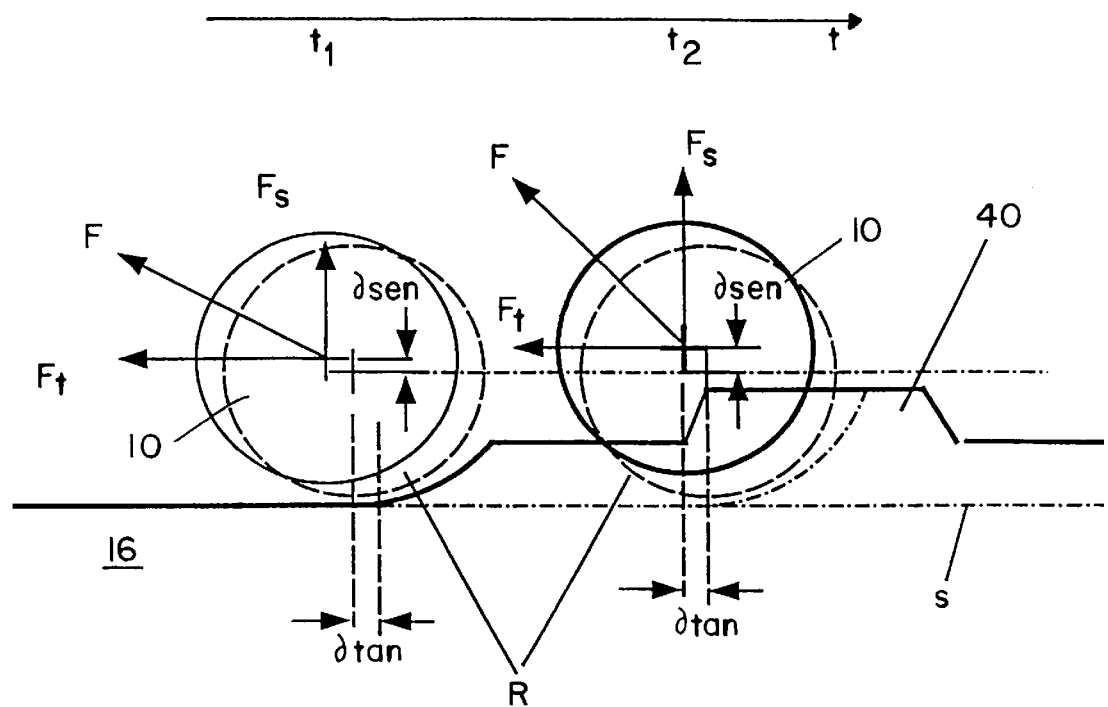
FIG. 4 show a deflected wire electrode in cross-section during trim cutting of form defects.

FIG. 4 shows schematically, for two consecutive states t1 and t2, the excursion of the wire electrode 10 during a trim cut for correcting form errors. Here, too, the wire electrode 10 is shown in cross-section in high magnification. The dashed outlines indicate the corresponding rest position R of the wire electrode 10, the continuous outlines indicate its position under loading by the machining forces. Once more, F denotes the excursion force acting on the wire electrode 10 during the machining operation wherein the excursion force is composed of a component $F_s$ perpendicular to the cutting direction and a component $F_t$ tangential to the cutting direction. Each of these components results in an excursion component perpendicular to the cutting direction (δ sen) and an excursion component tangential to the cutting direction (δ tan).

At time t1, the wire electrode 10 is located at a certain distance from the workpiece, with the wire excursion indicated in FIG. 4. When the wire electrode 10 travels along the contour of the workpiece, the magnitude and the direction of the total force F acting on the wire electrode 10 change as a result of the varying surface topography 40. This necessarily also changes the wire excursion. According to the present embodiment of the invention, such a change in the wire excursion is counteracted by modifying the forward feed rate, in this case by reducing the forward feed rate of the x/y motion, in such a way that the magnitude and the direction of the excursion tangentially and perpendicular to the cutting direction remain constant. Consequently, the values of the excursion components δ tan and δ sen in state t2 correspond to the values of the excursion components δ tan and δ sen in state t1.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A method for electro-erosive machining with a wire electrode by making adjustments for an excursion of the wire electrode caused by the electro-erosive machining, comprising the steps of continuously measuring the excursion of the wire electrode; and modifying in a closed loop at least one erosion parameter by imposing a transversial force on the wire electrode, such as to maintain the wire excursion (a) of the wire electrode constant during the machining operation.

2. The method according to claim 1, further comprising the step of correcting a programmed cutting contour by the wire excursion (a) in such a way that the wire electrode travels along a pre-set reference cutting path.

3. The method according to claim 1, further comprising the step of selecting as erosion parameter one of the pulse frequency of the machining pulses and the forward feed speed (Vx, Vy) of the wire electrode.

4. The method according to claim 3, further comprising the steps of one of controlling the wire excursion (a) at a pre-set pulse frequency as a function of the cutting speed (Vx, Vy), and the wire excursion (a) at a pre-set cutting speed (Vx, Vy) as a function of the pulse frequency, and as a function of the pulse frequency and of the cutting speed (Vx, Vy).

5. The method according to claim 1, wherein the erosion parameters are controlled such that the excursion (a), depending at least on one of the type of cut and the machining current, has a pre-set value—both tangentially (δ tan) and perpendicular (δ sen) to the cutting path.

6. The method according to claim 5, wherein the direction of the reference excursion is selected as at least one of a) opposite to the cutting direction for a straight full cut;

b) with a tangential (δ tan (soll)) component and a perpendicular component (δ sen (soll)) relative to the cutting direction for a curved full cut; and c) crosswise to the cutting direction for finish cuts.

7. The method according to claim 1, wherein, if the measured wire excursion falls below a pre-set minimum value, then measures for preventing deteriorations in the process are automatically initiated, in particular measures for preventing a short circuit or a wire break.

8. The method according to claim 1, further comprising the steps of measuring the rest position (R) of the wire electrode before starting the machining operation and storing a reference value for the wire excursion (a).

9. The method according to claim 1, further comprising the steps of continuously monitoring the resistance of the working gap and compensating for any deviations from a reference value by increasing the flushing pressure.

10. The method according to claim 1, further comprising the steps of monitoring the machining operation by using an inner control loop having a higher speed than the control for the wire excursion, based on at least one of ignition delay, average machining voltage, number of no-load pulses and occurrence of short circuits.

11. A closed loop control system for a wire erosion machine, comprising:

a) at least one wire position sensor (30) for continuously measuring a wire excursion (a) of a wire electrode; and b) a closed loop controller for effecting at least one of erosion parameters by imposing a transversal force onto the wire electrode, such that the wire excursion (a) remains constant during the machining operation.

12. The control system according to claim 11, wherein the controller comprises a comparator and a controller output transmitter, which modifies at least one of pulse frequency of the machining pulses and forward feed speed (Vx, Vy) of the wire electrode as a function of the control difference.

13. The control system according to claim 11, further comprising a memory for receiving the signals from the wire position sensor and for storing the position of the wire electrode in rest position (R) before the machining operation starts.

* * * * *